United States Patent [19]

Mort et al.

[11] Patent Number: 5,428,814
[45] Date of Patent: Jun. 27, 1995

[54] SPACE COMMUNICATIONS APPARATUS EMPLOYING SWITCHABLE BAND FILTERS FOR TRANSPARENTLY SWITCHING SIGNALS ON BOARD A COMMUNICATIONS SATELLITE, PAYLOAD ARCHITECTURES USING SUCH APPARATUS, AND METHODS OF IMPLEMENTING THE APPARATUS AND THE ARCHITECTURES

[75] Inventors: Robert Mort, Toulouse; Denis Rouffet, Boulogne-Billancourt, both of France

[73] Assignee: Alcatel Espace, Courbevoie, France

[21] Appl. No.: 105,947

[22] Filed: Aug. 13, 1993

[30] Foreign Application Priority Data

Aug. 14, 1992 [FR] France ................... 92 10043

[51] Int. Cl.⁶ .................................. H04B 7/185
[52] U.S. Cl. ................. 455/12.1; 455/13.3; 455/103; 455/339; 333/101; 333/132
[58] Field of Search ............. 455/8, 12.1, 13.3, 13.4, 455/20, 101, 103, 338, 339; 333/178, 193, 132, 101; 375/102, 103; 379/248; 358/425; 348/659

[56] References Cited

U.S. PATENT DOCUMENTS

| | | | |
|---|---|---|---|
| 3,872,410 | 3/1975 | Zucker | 455/338 |
| 4,144,495 | 3/1979 | Metzger | 455/13.3 |
| 4,232,266 | 11/1980 | Acampora | 455/13.3 |
| 4,349,915 | 9/1982 | Richardson | 455/23 |
| 4,628,507 | 12/1986 | Sperlich | 455/13.3 |
| 4,858,225 | 8/1989 | deSantis | |
| 4,901,085 | 2/1990 | Spring et al. | 455/13.3 |
| 5,287,543 | 2/1994 | Wolkstein | 455/13.3 |

FOREIGN PATENT DOCUMENTS 2169474A 7/1986 United Kingdom .

OTHER PUBLICATIONS

Ananasso, Fulvio et al, "On–Board Technologies for User–Oriented SS–FDMA Satellite Systems", *IEEE International Conference on Communications*, vol. 1, No. 8.2, Jun. 1987, pp. 244–248.

Shinonaga, Hideyuki et al, "L–band Bandwidth–Variable Saw Filter Matrix", *IEEE International Conference on Communications*, vol. 3, No. 41.1, Jun. 1989, pp. 1255–1262.

*Primary Examiner*—Reinhard J. Eisenzopf
*Assistant Examiner*—Andrew Faile
*Attorney, Agent, or Firm*—Sughrue, Mion, Zinn, Macpeak & Seas

[57] ABSTRACT

The invention relates to switchable band filter apparatus for switching signals on-board a satellite, enabling signals of different and unforeseeable bandwidths to be switched between multiple input ports and multiple output ports. The invention also provides various payload architectures using such apparatus. Finally, the invention provides methods of implementing such apparatus and architectures for performing transparent switching of signals on-board a satellite.

22 Claims, 6 Drawing Sheets

SPACE COMMUNICATIONS APPARATUS EMPLOYING SWITCHABLE BAND FILTERS FOR TRANSPARENTLY SWITCHING SIGNALS ON BOARD A COMMUNICATIONS SATELLITE, PAYLOAD ARCHITECTURES USING SUCH APPARATUS, AND METHODS OF IMPLEMENTING THE APPARATUS AND THE ARCHITECTURES

The invention relates to the field of telecommunications, in particular telecommunications by radio beam, and more particularly telecommunications by satellite. Telecommunications satellites receive radio signals from one or more locations on the surface of the earth (up links), they amplify them, and they transmit them back to the earth (down links).

BACKGROUND OF THE INVENTION

With progress in satellite telecommunications, continuous growth is observed in satellite capacity in terms of the number of communications channels that can transmit in this way via the satellite, and also in terms of the throughput of each channel. In order to maximize the efficiency of a satellite in terms of service given for money invested, attempts are made to extend satellite lifetime as much as possible while simultaneously increasing both the quantity and the quality of the service that can be provided.

To this end, it is necessary to minimize the use of any resource that is necessary for implementing and operating the space segment of a satellite telecommunications system, and in particular: the mass and the size of the vehicle and its on-board equipment; and on-board electrical power consumption; and it has already become necessary to conserve radio spectrum which is a limiting resource of which ever-increasing use is being made.

Several of these criteria are facilitated by using a plurality of narrow beams for down links, each beam being formed to optimize its "footprint" on the ground, so as to waste a minimum amount of energy radiated outside the region of the earth which is to be served by the beam. The beams are formed by high-gain antennas on the satellite, each beam having the main lobe of its radiating antenna pointing towards its service region.

Thus, a major portion of state of the art telecommunications satellites use an increasing number of narrower and narrower beams for down links. Depending on the type of antenna used for forming these beams, their positions (ground coverage) may be fixed or variable (steerable). In all cases, this progress gives rise to a problem that is at the core of the present invention. The satellite needs to pick up a signal coming from a given location, and to retransmit it to another location on a down link. The problem which then arises is a switching problem whereby the signal from a given receive antenna is conveyed through the electronics of the payload to a particular transmit antenna. The problem becomes more complex with growth in the number of channels or signals to be processed simultaneously, multiplied by the number of different destinations for said signals.

By analogy with the past of terrestrial telecommunications by radio beam, the term "channel" is used to mean a band of frequencies about a central frequency. Also for reasons of past history, this term as used in space refers to the authorized subdivision of the transmission spectrum into channels that are 36 MHz or 72 MHz wide, that being the conventional bandwidth of transponders for applications in telephony or in television. In contrast, for switching purposes, the concept of a channel may be generalized to that of a path followed by a signal between a source and a destination. For satellites that are presently in orbit, this generalization of the concept "channel" coincides with the above conventional definition.

In the prior art, satellite payload systems are known that enable channel switching to be performed on board the satellite, between an input port and an output port. The need for this switching capacity is fundamental, e.g. to ensure redundancy for key components that may fail. For example, in the event of a power amplifier breaking down, it is necessary to be able to switch signals to another, backup amplifier so as to be able to continue to provide the link.

Conventionally, such switching is performed by electromagnetic switches on waveguide transmission lines for channels having a bandwidth of 36 MHz or 72 MHz. In such systems, it is important to minimize the number of switches and waveguide lines because of the weight and the bulk of such components. As a result, this constraint constitutes a major constraint in the prior art with respect to designing payload architecture. Thus, transmission systems have been designed to maximize the traffic that can be conveyed by an architecture of this type in channels of 36 MHz or 72 MHz.

In particular, in order to be enable to convey the calls of an increasing number of customers through a payload whose number of channels must remain the same throughout the life of the satellite, signal encoding systems such as time division multiple access (TDMA) and frequency division multiple access (FDMA) have been devised. Signals encoded in this manner can convey the calls of a very large number of customers simultaneously, providing the customers use the same waveguide switch configurations as exist on board the satellite. In general, the configuration represents a path between a receive antenna and a transmit antenna on board the satellite, and by extension a path between an up link beam and a different down link, thus between an originating geographical location and a different destination geographical location on the terrestrial globe.

This kind of system clearly lacks flexibility as soon as numerous users that are geographically dispersed desire simultaneously to communicate with geographical locations that are covered by different beams. In addition, different users have different requirements concerning the bandwidth necessary for their calls, with this depending on the required data rate. An object of the present invention is to provide communications apparatus that enables a larger number of users to be served simultaneously, even in the event of very wide geographical dispersion between the originating locations of the signals and the destination locations of said signals, and which thus makes it possible to serve with maximum efficiency the variable-bandwidth requests of the various users.

OBJECTS AND SUMMARY OF THE INVENTION

The invention makes it possible for the capacity of a payload to progress so as to keep up with foreseeable progress in the number and different types of users. In Europe, access to telecommunications by satellite will soon no longer be reserved solely for national and international organizations such as Telecoms organizations and Intelsat. In particular, progress in the satellite telecommunications market shows up the emergence of private users such as multinational companies, for example, who seek to communicate with their geographically dispersed subsidiaries by means of a private communications network. Such users will rent a portion of the capacity of a satellite for their own needs, and this requires the satellite to be capable of being configured so as to satisfy a maximum number of simultaneous users.

As a result, studies concerning future telecommunications satellites have been concerned about the increasing number of "spot" beams, i.e. narrow receive and/or transmit beams that are defined by the main lobes of the antennas on board the satellite. The problem is to interconnect the spot beams on board the satellite so as to provide the desired links. The invention thus provides switching on the basis of allocating a path between two narrow spot beams, which path may vary in bandwidth and in center frequency. The apparatus of the invention seeks to implement n*m paths of this type where n is the number of up links served and m is the number of down links served. Several schemes are possible depending on the total frequency bandwidth to be switched, the number of spots, and the desired degree of flexibility.

The article by Piétro V. de Santis, entitled "Non-regenerative satellite switched FDMA (SS/FDMA) payload technologies", published in International Journal of Satellite Communications, Vol. 5, pp. 17114 182 (1987), by John Wiley and Sons Ltd. and whose contents is taken to form an integral portion of the present description describes the theory and several ideas for implementing such systems. In particular, a complete description is given of the demultiplexing operation as applied to variable bandwidth and variable center frequency, at least in outline. Various technologies are examined and compared with a view to implementing such a system, including surface acoustic wave (SAW) devices, magnetostatic waves (MSW) and monolithic microwave integrated circuits (MMIC).

In the lefthand column of page 177, last paragraph, that article lists the drawbacks of SAW technology and suggests MSW technology for overcoming those difficulties. In order to operate properly with various bandwidths, it is essential for amplitude and group propagation delay through the various SAW bandpass filters to remain uniform in the (frequency) regions between adjacent filters. According to the author, another drawback is that SAW components are generally used at intermediate frequencies. The author refers to another article by H. Shinonaga and Y. Ito entitled "SS/FDM system for digital transmission" published in the Proceedings of the 7th International Conference on Digital Satellite Communications, 12-14 May, 1986, Munich, Germany, which describes a combination of two SAW filters in parallel that is coherent in phase and in amplitude. A more recent article by the same authors entitled "SS/FDMA router for flexible satellite communications networks" published in IEEE Journal on Selected Areas in Communications, Vol. 10 (2), pp. 391-400 (February 1992) describes an embodiment in which the band of a 72 MHz transponder is subdivided into four sub-bands, initially by being divided into 35 MHz sub-bands, and subsequently by dividing one of these two bands into two 17 MHz sub-bands.

The Applicant has chosen to develop an original configuration which appears better to satisfy the requirements and constraints imposed in such a system. For example, applications have been studied by the Applicant for using half the bandwidth allocated to satellite fixed surface (SFS) between 12.5 GHz and 12.75 GHz, i.e. 125 MHz. In bandwidth terms, this band corresponds to three conventional 36 MHz repeaters with guardbands of about 4 MHz. The intended flexibility is flexibility enabling two non-coded PSK4 2Mb/s carriers or one PSK2 2Mb/s carrier encoded by a code having efficiency of ½ to be conveyed. Under such circumstances, a band quantum of 3 MHz is selected, with guardbands of about 3.5 MHz. The instantaneous total bandwidth is thus to be shared between these various simultaneous users in quanta of 3 MHz. The switch of the invention is thus required to interconnect various sub-bands coming from different origins and having different destinations, when said sub-bands may be of varying and different bandwidths and where the center frequencies of each sub-band are likewise different and varying. In an optimum embodiment, the switch is "transparent" to the signals it conveys, regardless of the form of the signals, the way they are encoded (TDMA, FDMA, PSK2, 4, 8, 16, ... ), their time-division structure, their bandwidths, their center frequencies, their origins, or their destinations.

To these ends, the invention provides apparatus for transparent switching, particularly for use in space, payload architectures using such apparatus, and methods of implementing the apparatus and the architectures.

More precisely, the invention provides apparatus comprising an integrated bank of filters that are associable by switching [acronym: BIFFAC] for switching input signals Si on n input ports to output signals So on m output ports, each signal having a center frequency and occupying a bandwidth about said center frequency, the apparatus comprising at least p bandpass filters of bandwidth $\Delta\Phi$, with center frequencies $f_j$ where j is an integer in the range 1 to p inclusive, the filters being such that the frequency difference between the center frequencies of two filters that are adjacent in frequency is substantially equal to the width $\Delta\Phi$ of the passband of the bandpass filter, the number p being selected as a function of the bandwidth of the widest signal to be switched $\Delta F_{max}=p\Delta\Phi$, said input signal Si being applied to the inputs of p filters; the apparatus further comprising a switching and combining matrix, said matrix having not less than p inputs and not less than m outputs, said inputs to said matrix being connected to said bandpass filters so as to pick up the signals passing through said filters; wherein said filters and the various paths through said switching matrix are matched in phase and in amplitude.

According to an advantageous characteristic, said bandpass filters are implemented in surface acoustic wave [SAW] component technology. According to another characteristic, a plurality q of said filters are integrated on a single substrate, and optionally a plurality of said substrates are used to cover the entire desired band. Alternatively, said bandpass filters are implemented in digital technology.

According to another characteristic of the apparatus of the invention, a plurality of filters may be integrated with a switching and combination matrix in a single housing, forming a transparent switching module. The payload may then include one or more modules of this type. In a variant, the filters and a matrix may be integrated on a single substrate.

Depending on the variant, the SAW filters may be made on substrates of $LiNbO_3$, of $LiTaO_3$, of quartz, ...

Various architectures are also proposed for implementing apparatus of the invention. More precisely, the invention provides a payload architecture for use in space to enable transparent switching of signals Si on n input ports to signals So on m output ports, each signal Si having a center frequency $Fc_i$ and occupying a bandwidth about said center frequency, said signals being capable of having different center frequencies and being capable of occupying different bandwidths for the different signals, the architecture further including at least one bank of filters and at least one switching and in-phase summing matrix, wherein said filters and said matrix are integrated in at least one apparatus according to the invention.

Advantageously, the architecture of the invention further includes at least one frequency-changing assembly, which, according to another characteristic, may be divided into a plurality of frequency-changing subassemblies in order to perform a plurality of frequency changes on board the satellite while conveying the signal that is to be switched.

In a variant, said frequency-changing assembly comprises two frequency-changing subassemblies: a first subassembly that performs a first change from the frequency of the input signal Si to an intermediate frequency IF, using a first local oscillator which is at the same frequency for all of the signals and all of the BIFFACS, and after filtering in said filters and after switching and in-phase combining in said matrices, a second subassembly performs a second frequency change using a second local oscillator from IF to a final frequency of the output signal So for the down link; in such a manner that the bandwidth at intermediate frequency is the same as the bandwidth of the input signal Si and of the output signal So.

In another variant, said frequency-changing assembly comprises three frequency-changing subassemblies which perform four successive frequency changes: a first change from the frequency of the input signal Si to a first intermediate frequency $IF_1$ is performed using a single local oscillator frequency for all of the input signals Si; a second frequency change to a second intermediate frequency $IF_2$ prior to application to the inputs of said apparatuses according to claim 1 [BIFFACs], where all of the BIFFACs have the same center frequency, said second intermediate frequency $IF_2$ being the same for all of the BIFFACs, thereby requiring a plurality of local oscillator frequencies [at least one per BIFFAC]; after filtering in said filters and after switching and in-phase combining in said matrices, a third frequency change is performed to the first intermediate frequency $IF_1$, using the same local oscillators as in the preceding change; and finally a fourth frequency change is performed by the third subassembly to a final frequency for the output signal So of the down link.

In another variant, said frequency-changing assembly comprises a frequency-changing subassembly for each up link input signal Si and for each down link output signal So, and utilization frequencies are distributed in such a manner that the bandwidths of the input and output signals Si and So are integer multiples of the unit bandwidths of a BIFFAC.

The invention also provides methods of implementing the transparent switching apparatus (and variants thereof) and the payload architecture (and variants thereof).

Thus, the invention provides a method of switching on-board a satellite, the method performing switching between input signals Si on n input ports to output signals So on m output ports, each signal having a center frequency and occupying a bandwidth about said center frequency, said signals being capable of having different center frequencies and being capable of occupying different bandwidths for different signals, the method further including the following steps for each signal to be switched:

the signal to be switched coming from one of the n input ports and having a bandwidth $\Delta F = p\Delta\Phi$ is applied via a first switching matrix to a bank of bandpass filters having a passband $\Delta\Phi$ for all of the filters, thereby splitting the input signal Si into a plurality, p, of narrow bands of constant width $\Delta\Phi$ regardless of the bandwidth of said signal $\Delta F = p\Delta\Phi$, which corresponds to an operation of demultiplexing the signal; and the signal is then reassembled in phase from the p bands of width $\Delta\Phi$ by means of a second switching and summing matrix which sends the p bands of width $\Delta\Phi$ to one of the m output ports; which corresponds to a multiplexing operation;

the configuration of the switching matrices being controllable in sufficient time as a function of the duration of the signals, of the sources and of the destinations respectively of the input ports and of the output ports, and of the bandwidth $\Delta F$, i.e. the number p of bandpass filters of bandwidth $\Delta\Phi$ required for transmitting them without degradation.

In a variant of the method of the invention, and in the event of the architecture including a frequency changing assembly, the invention provides, in addition to the steps mentioned above, the following steps:

prior to the input signals being demultiplexed, and with said signals Si being characterized by a first center frequency $Fc_i$ in the microwave range, frequency conversion is performed to a lower intermediate frequency IF; and after the signals have been multiplexed at intermediate frequency IF, frequency conversion is performed to a higher second center frequency $Fc_o$, in the microwave range, said frequency being characteristic of the output signal So.

Depending on the variant of the method of the invention, the frequencies $Fc_i$ and $Fc_o$ may be different or similar. Nevertheless, it should be observed that interference may occur between the transmit port and the receive port when the frequencies are similar. This problem can then be overcome either by providing excellent isolation between the receive and transmit ports, by space diversity, or else by using time-division coding schemes that enable the receive port to be switched off during transmission. That is why it is preferable, at present, for the frequencies to be different.

Finally, different proposed variants of the method of the invention make it possible to cause existing infrastructure to progress towards the solutions provided in the context of the present invention. In particular, for better compatibility with channeled transponders having a bandwidth of 36 MHz or of 72 MHz, provision is made for the elementary bands that are to be switched to be of a bandwidth that is less than 36 MHz. To draw the greatest advantage from using transparent switching as provided by the invention, it is advantageous for the bandwidth ΔFi of the input signals Si to be substantially less than 36 MHz, at least for a major portion of the signals to be conveyed. Similarly, it is advantageous to select a bandwidth ΔΦ for the bandpass filters that is substantially less than 36 MHz. In a particularly advantageous variant of the invention, the bandwidth ΔΦ of the bandpass filters is equal to or less than 6 MHz.

BRIEF DESCRIPTION OF THE DRAWINGS

Other characteristics and advantages of the invention appear from the following detailed description and the accompanying drawings, in which:

FIG. 1 is a diagram comprising a portion 1a that shows an integrated bank of filters that can be associated by switching (BIFFAC) of the invention, and a portion 1b that shows a frequency distribution plan for the bandpass filters of the apparatus;

The figures are given by way of example and are not limiting, neither with respect to the object of the invention nor with respect to the scope of the protection claimed. In the various figures, the same elements are given the same references.

MORE DETAILED DESCRIPTION

Figure 1A:
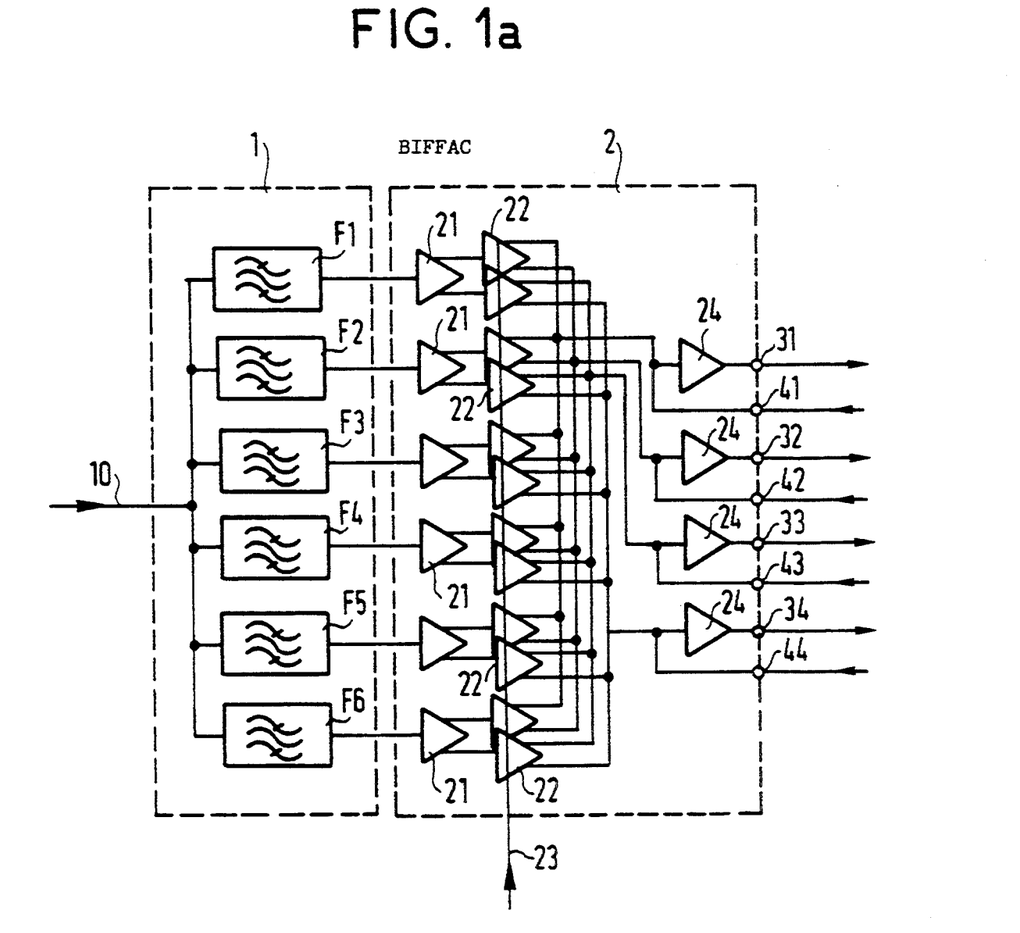

FIG. 1a shows an example of an integrated bank of filters that are associable by switching (BIFFAC) of the invention. The example shown is deliberately simple in order to illustrate the principle of the invention; nevertheless, as will be seen below, the dimensioning selected in this example is advantageous for implementing a BIFFAC complying with certain preferred technological criteria.

Figure 1B:
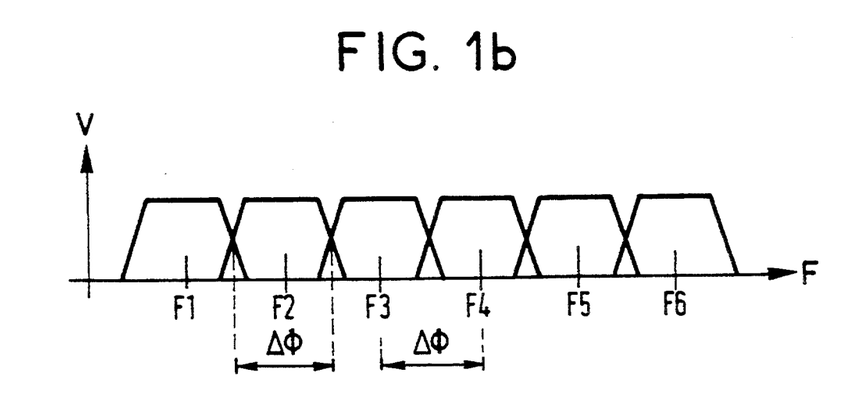

The BIFFAC of FIG. 1a comprises two major portions: a bank (1) of bandpass filters (F1, F2, F3, F4, F5, and F6); and a switching and combining or summing matrix (2). The configuration shown in FIG. 1 corresponds to demultiplexing; multiplexing is accomplished with similar apparatus that is reversed relative to the apparatus shown in this figure. An input signal Si to be switched as applied to the input (10) of the BIFFAC apparatus of the invention is applied to the input of each of the bandpass filters (F1–F6) in parallel. As shown in FIG. 1b, the filters have a passband of width ΔΦ for all of the filters, and the difference between the center frequencies $f_j$ and $f_{j+1}$ of two adjacent filters Fj and Fj+ 'is substantially equal to ΔΦ.

The filters are thus contiguous in frequency. According to a preferred characteristic of the invention, these filters are also contiguous physically, and they may be implemented on a single substrate in order to save weight and bulk. Another advantage of such a configuration is that possible variations in temperature have the same effect on all of the filters, and therefore have no undesirable effect on signals passing through the apparatus.

A signal Si present at the input (10) of the apparatus is thus analyzed in frequency by the bank of contiguous bandpass filters (F1–F6). Assuming that the signal Si is a signal that is frequency multiplexed using a frequency plan similar to the frequency plan shown in FIG. 1b, then the signal will in fact be demultiplexed by the bank of filters, and split up into its separate components. Thereafter, the output from each bandpass filter (F1–F6) is connected to one of the inputs (21) of the switching and combining (or summing) matrix (2). In the description below, the terms "combining" and "summing" may be used interchangeably for designating the same operation.

In FIG. 1a, the inputs (21) are represented by amplifier symbols. In the apparatus of the invention, such an amplifier serves firstly to adjust the relative amplitudes of the signals that propagate through the various filters so as to enable them to be reassembled after demultiplexing without introducing amplitude distortions as a function of frequency, and secondly to compensate for any insertion losses that may exist in the bank of filters (1). Such losses may be relatively high (about 20 dB to 30 dB for SAW filters). Secondly, in practical embodiments, an amplifier in this location, even if it has unity gain, also serves to isolate the bank (1) of filters from the matrix (2) so as to avoid transient effects propagating in the backwards direction. The input amplifiers (21) are then connected to SPXT type switches where X corresponds to the number of output ports (31–34) of the matrix (2). In the example of FIG. 1a, there are four such output ports. To simplify the control logic (23) and as shown in the figure, it is possible to split up the SPXT switches corresponding to each bandpass filter (F1–F6) into X/2 SPDT switches (22).

The SPDT switches (22) are then all interconnected via their respective outputs, as shown in the figure. Thus, the matrix (2) sums the signals at the first position outputs of all of the SPXT switches to deliver them to the first output (31) of the matrix (2) via an amplifier (24), while simultaneously summing all of the signals on the second position outputs of all of the SPXT switches, and so on. This summing is performed by a passive coupler for each port connected to an output amplifier (24) for each port. The geometry of this passive coupler is designed to conserve phase coherence of signals propagating on parallel ports, i.e. having different center frequency components, even though they propagate through different bandpass filters and through different switches. In other words, propagation time must be substantially the same for all of the signals heading towards a given output.

Thus, the BIFFAC apparatus of the invention is tuned in amplitude and in phase for signals propagating through the bank (1) of filters and through the combining or summing matrix (2).

Figure 2:
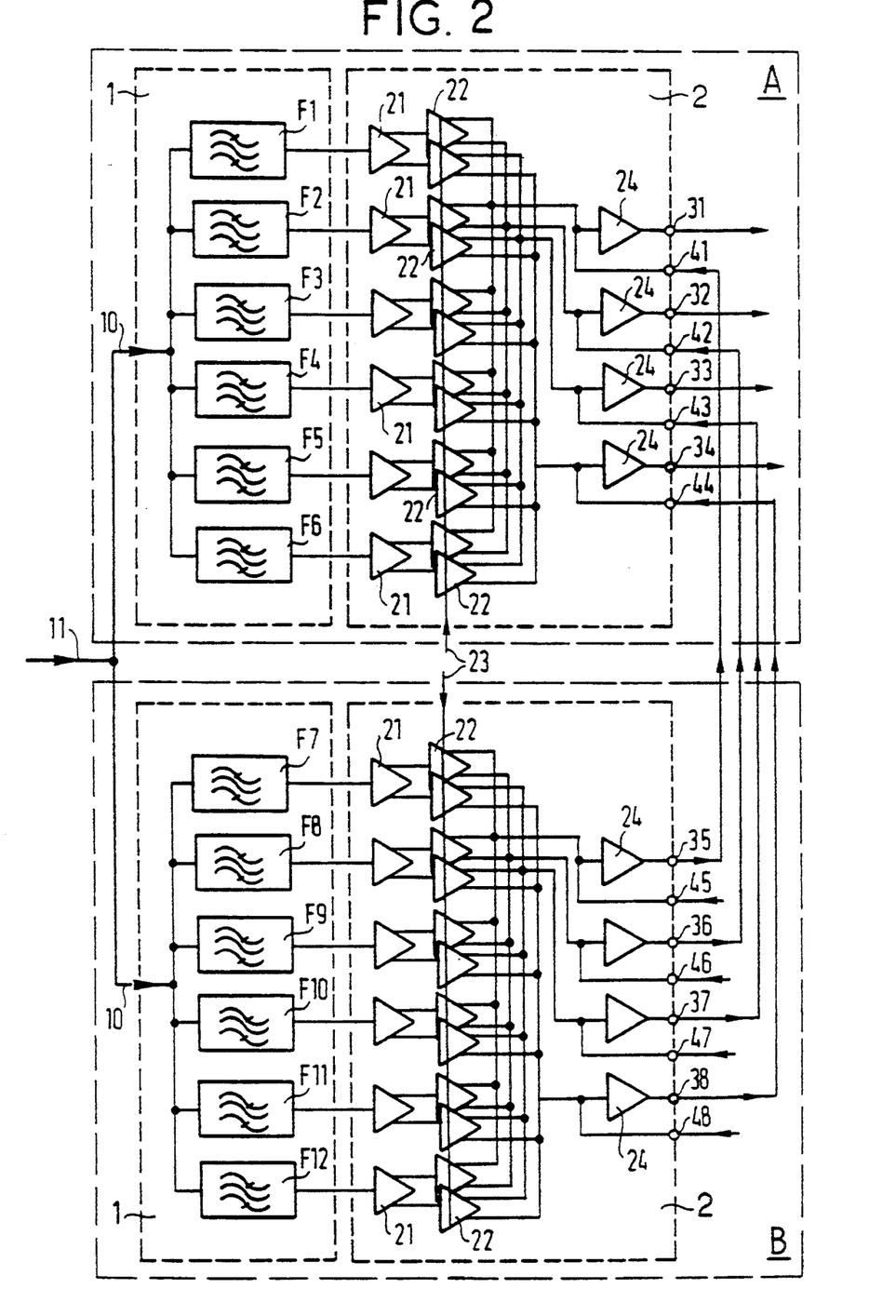
FIG. 2 is a diagram showing two BIFFACs of the invention that are associated in parallel to obtain a usable band of twice the width of the preceding example.

As FIG. 1a shows, provision is also made for auxiliary inputs (41–44) which are connected directly to the inputs of the output amplifiers (24), thereby enabling a plurality of unit BIFFACs to be connected together in parallel so as to obtain a wider operating band (for demultiplexing, for example). Such a configuration is shown in FIG. 2.

Several designs can be used to implement the above-described function. They are summarized below. By examining the surface wave filter portion and then the switching/combining portion.

Five types of embodiment are possible:

a. Chirp Fourier transform

The principle of this embodiment is to transform the entire up signal into a time spectrum series and then to perform filtering and routing by sampling. The output signals are obtained by the inverse transform.

In spite of the power of this method of signal processing, technology limits the passband of each component to about 10 MHz and above all limits its dynamic range to less than 30 dB.

b. Bandwidth switchable SAW filters (BSSF)

A bank of discrete, adjacent, and switchable filters is implemented. The design of these filters is such that it is possible by phase combination to implement different passbands. Temperature stability between filters and high losses pose problems, as does the high mass of each assembly.

c. Cascaded filters

N periodic filters of different passbands are connected in cascade, thereby enabling N bandwidths to be selected. The main drawbacks of this method are the small number of bandwidths that can be implemented and the level of insertion losses.

d. VBVCF filters

Variable band variable center frequency (VBVCF) filters can be implemented by cascading two surface wave filters, each of them being preceded and followed by a mixer whose local oscillator is implemented by means of a synthesizer. The overlap of filter bands determines the passband and the center frequency. This method is no longer desirable once the number of connection paths is high because hardware complexity increases very quickly. Similarly, the spectral purity of the oscillators and the performance at the edges of the filter bands can be criticized.

e. Band variant surface (BVS) wave

This is the principle that has been selected, and comprises a bank of filters integrated on a common substrate. The input transducer may be implemented so as to minimize the losses that are usually present in a bandpass filter.

Accurate phase balancing of the various filters is necessary to enable the responses of adjacent filters to be concatenated.

In FIG. 2, there can be seen two BIFFACs (A, B) both the same as that shown in FIG. 1a, and connected in parallel. As in FIG. 1a, the configuration shown is for demultiplexing, but a multiplexer has the same configuration only reversed. A signal Si presented at input 11 is applied simultaneously to the inputs 10 of both BIFFACs (A, B). Everything takes place as before. The center frequency $f_7$ of bandpass filter F7 may be chosen to differ from the center frequency $f_6$ of bandpass filter F6 by an amount that is substantially equal to the width of the passband $\Delta\Phi$ of the bandpass filters. Under such circumstances, the apparatus shown in FIG. 2 operates exactly like the apparatus shown in FIG. 1a, but with a total operating band that is twice as wide.

After the signals in the second BIFFAC (B) have been combined and summed and then amplified by the output amplifiers (24), the signals appearing on the output lines (35–38) of the second BIFFAC (B) are connected via their auxiliary inputs (41–44) to the output amplifiers (24) of the first BIFFAC (A). In this situation, care must be taken to ensure that the phase and amplitude relationships of the signals propagating on the various ports are satisfied as in the preceding case. In particular, the propagation time through the second BIFFAC (B) must be shorter than through the first BIFFAC (A) by the time taken for propagation between the BIFFACs, since it is necessary for the signals that have passed through the filters (F7–F12) of the second BIFFAC (B) to reach the inputs of the output amplifiers (24) of the first BIFFAC (A) simultaneously with the signals that have passed through the filters (F1–F6) of the first BIFFAC (A). It is also possible to connect a third BIFFAC in parallel in the same manner, using the auxiliary inputs (45–48) of the output amplifiers (24) in the second BIFFAC (B).

Thus, for a given number of filters for covering a maximum given frequency band of input signals, said number of bandpass filters being selected as a function of the desired configuration of flexibility, it is possible to provide for said number to be divided into some number of modular BIFFACs, with each BIFFAC including a certain number of filters integrated on one or two substrates, and with the entire switching and summing matrix being integrated on another substrate or, in another and preferred example, the same substrate. For example, the configuration of the example of FIG. 2 shows twice six filters integrated on two substrates with two other substrates constituting two six-input and four-output matrices. The level of integration should be selected to be as high as possible so as to reduce mass and bulk of the assembly, and also so as to minimize variations in the characteristics of the filters as a function of variations in temperature.

Figure 3:
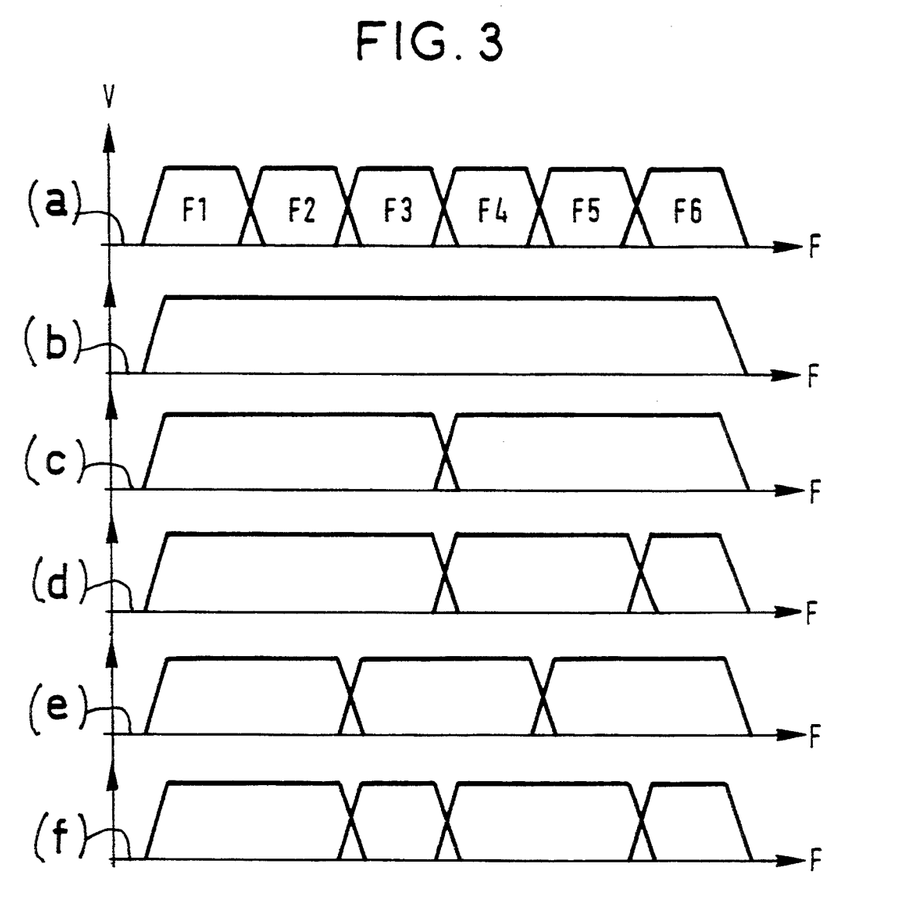
FIG. 3 is a diagram showing various possible combinations and filtering options that result therefrom, in the frequency domain, using six elementary filters integrated in a BIFFAC of the invention.

FIG. 3 shows various different frequency plans that can be implemented using the elementary BIFFAC shown by way of example in FIG. 1. The first line (a) shows the amplitude response (V) vs. frequency (f) for a bank (1) of bandpass filters as shown in FIG. 1.

In the example shown in line (b) of FIG. 3, all of the switches are in the same position, thereby directing the signals to a single output. In this way, signals coming from various different bandpass filters are combined to give rise to band filtering that is six times as wide as the unit band of a single unit filter. To ensure that the amplitude of the signal filtered in this way does not suffer from distortion, it is important for the unit filters to be tuned in phase and in amplitude relative to one another, in accordance with an essential characteristic of the invention.

On line (c) of FIG. 3, there can be seen a frequency plan for filtering as two frequency bands, each band occupying three of the unit bands of the unit filters of the BIFFAC. This filtering can be obtained by placing the switches of three adjacent unit filters in a position that corresponds to a first output, and the switches of the other three filters in a position corresponding to a second output.

In line (d) of FIG. 3, there can be seen a frequency plan corresponding to filtering three frequency bands of different widths. A first band combines unit band signals corresponding to the filters F1, F2, and F3; a second band combines unit band signals corresponding to the filters F4 and F5; and a last band corresponds to the unit band of filter F6. These various bands are the result of the switches being positioned in a manner similar to the preceding case. It can be seen that the switching and combining matrix of the invention provides a large amount of flexibility in filtering since, merely by switching, it makes it possible to configure filters of different bandwidths and of different center frequencies, and also to reconfigure such frequency plans at will.

Line (e) of FIG. 3 shows another configuration having three outputs and three frequency bands, this time of equal width. Each band comprises two unit bands: F1+F2; F3+F4; F5+F6.

Line (f) of FIG. 3 shows a final example for serving four outputs with four frequency bands. In this example two of the bands correspond to unit bands (F3, F6), while the other two bands are twice as wide, corresponding respectively to unit filters Fi+F2, and F4+F5.

It is clear on examining the examples provided in FIG. 3 that the configurations shown do not constitute an exhaustive list: other filter combinations are naturally possible using the BIFFAC of the invention.

Figure 4:
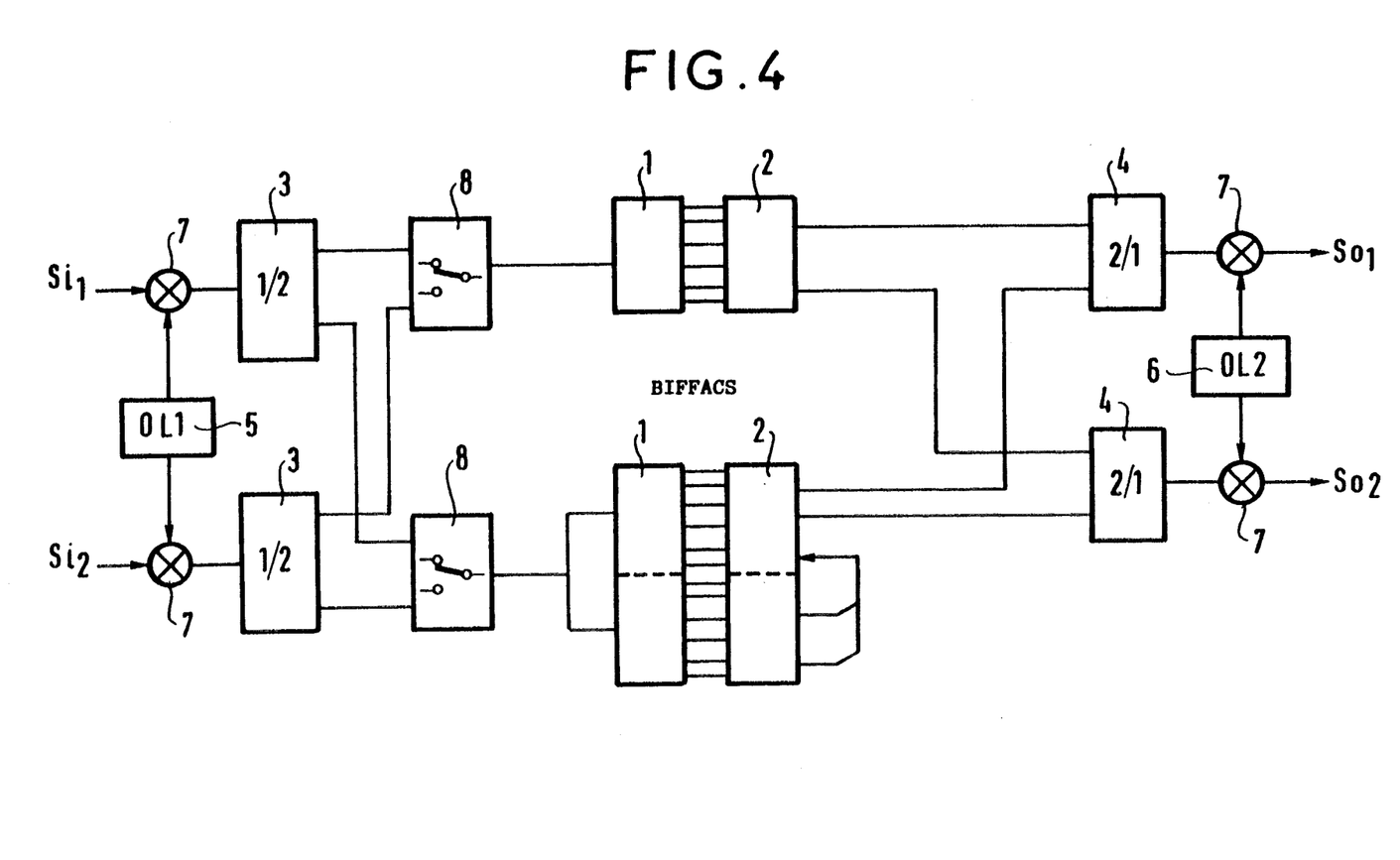
FIG. 4 is a block diagram showing one example of payload architecture that uses a plurality of BIFFAC apparatuses of the invention and that is suitable for performing narrowband switching.

FIG. 4 is a block diagram of a first example of payload architecture using a BIFFAC apparatus of the invention suitable for performing narrow band switching. In this type of switch, the total processed bandwidth is limited, and may be about 60 MHz, for example. The intermediate frequency band (IF) is the same as the input signal band ($Si_1$, $Si_2$) and the output signal band ($So_1$, $So_2$); the IF band is a translated image of the microwave band and signals retain their spectrum positions between the inputs and the outputs.

The figure shows that the two input signals ($Si_1$, $Si_2$) are applied to respective inputs of two mixers (7) where they are mixed with a signal coming from a first local oscillator OL1 (5) that is applied to the other input of each of the mixers (7) to perform frequency translation to IF. Thereafter, the IF translated signals are conveyed to 3 dB couplers (3) to spread each signal over two ports, which signals are then conveyed to two DPST switches (8).

For a band limited to 60 MHz and for three BIFFACs each occupying about 20 MHz (ignoring guardbands), connectivity must be restricted to two up links. Up link flexibility consists in allocating 18 MHz or 36 MHz to them by using these two switches (8) to switch them either to a single BIFFAC (1, 2) over the top port, or else to the group of two BIFFACs over the bottom port of FIG. 4. The sole BIFFAC on the top port is as shown in FIG. 1, for example, having six unit filters (F1–F6) each occupying 3 MHz, giving a total of 18 MHz. The two BIFFACs on the bottom port are as shown in FIG. 2, for example, having twelve unit filters (F1–F12) each of 3 MHz, giving a total of 36 MHz.

The signals at the outputs from the BIFFACs are then conveyed through combining couplers (4) to the first inputs of two mixers (7) whose second inputs receive a signal coming from a second local oscillator OL2 (6) that performs second frequency translation from IF to a radiofrequency RF for the down link. In general, the RF frequency of the down link is different from the RF frequencies of the up links in order to avoid possible interference between the transmit ports and the receive ports.

This solution makes use of common frequency transpositions between inputs or outputs. With channeled transmission, the frequencies of the IF to microwave (RF) frequencies must be adapted to re-compact the spectrum of the down links for the purpose of directing them to power transmitters (TOP, SSPA, . . . ). The power transmitters deliver output signals $So_1$ and $So_2$ to the down links that may be directed to ground footprints that are different or that coincide.

Figure 5:
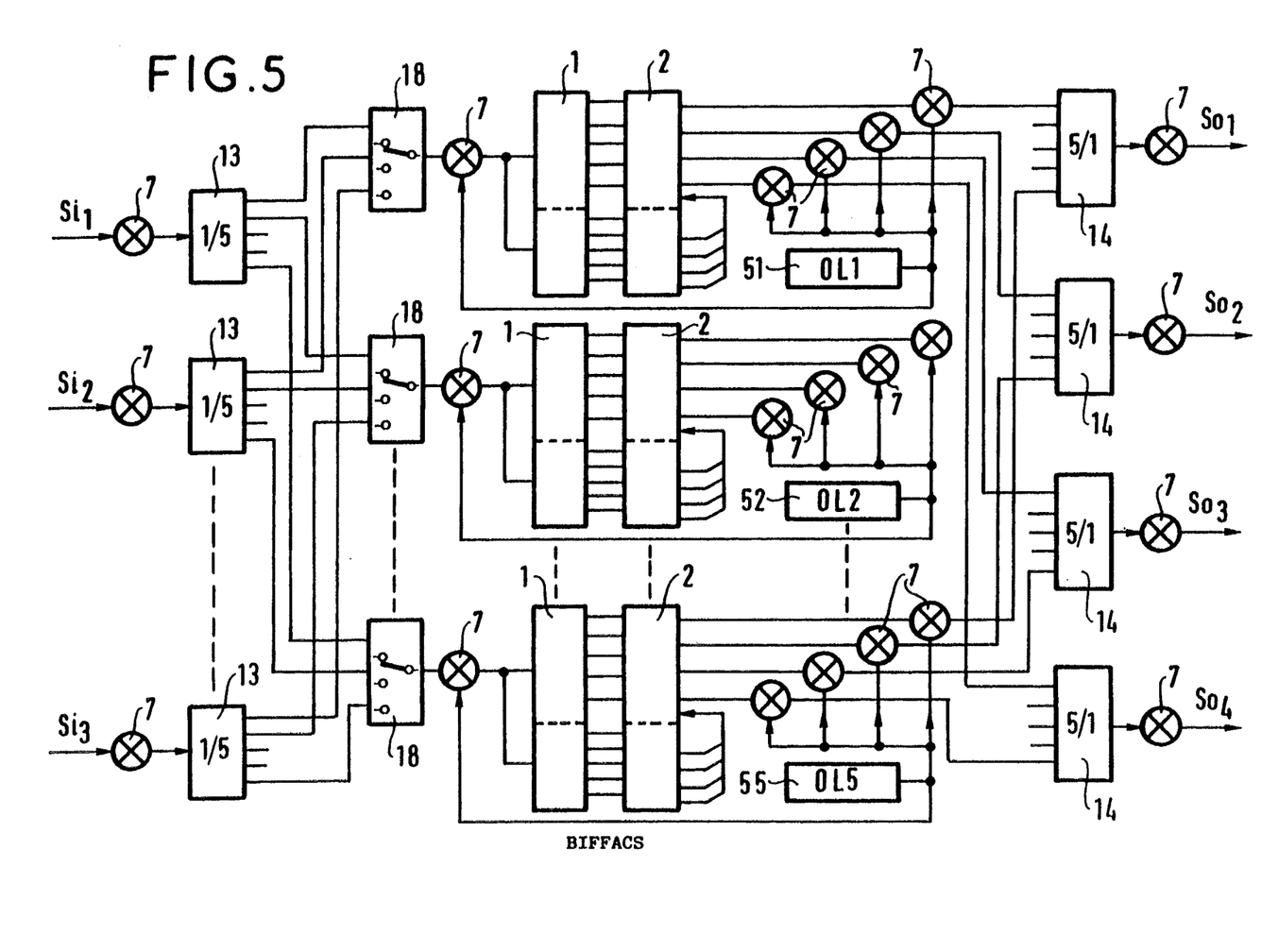
FIG. 5 is a block diagram showing an example of payload architecture using a plurality of BIFFAC apparatuses of the invention and suitable for performing wideband switching.

FIG. 5 is a diagram of another example of payload architecture making use of a plurality of BIFFAC apparatuses of the invention and suitable for wideband switching. In this type of switch, the processed band is wider than in the preceding case, e.g. 125 MHz to 250 MHz wide. However the IF band may be limited by using a frequency transposition specific to each pair of BIFFACs by means of a plurality of local oscillators (51, 52, . . . , 55) at different frequencies. With reference to the figure, the example chosen comprises a configuration of three up link spots with input signals $Si_1$, $Si_2$, and $Si_3$; and four down link spots with output signals $So_1$, $So_2$, $So_3$ and $So_4$. In this example, the available bandwidth, 250 MHz, is subdivided into five portions for application to the inputs of five pairs of BIFFACs.

Input signals $Si_x$ are initially translated to a first intermediate frequency by means of first mixers (7) prior to being spread in power by 1 to 5 couplers (13) which convey the signals to 3PST switches (18). These switches 18 select the input spot that is subsequently applied to a second mixer (7) whose other input comes from one of the local oscillators (51, 52, . . . , 55). Each of these oscillators has a frequency that differs from the frequency of its immediate neighbor, the frequency difference being equal to the bandwidth of a pair of BIFFACs (1, 2). In this way, the wideband of the input signals $Si_x$ is split up into a plurality of sub-bands of narrower bandwidth (five sub-bands in the present example), which sub-bands are subsequently shifted to a single intermediate frequency band (BIFFAC IF) for application to the five identical BIFFACs.

By way of example, for an input band of width 200 MHz, five 40 MHz bands can be obtained by transpositions using local oscillator frequencies that differ from one another by 40 MHz, and by applying the transposed signals to pairs of BIFFACs that have a bandwidth of 40 MHz. In the architecture of this example, the center frequency of all five BIFFACs is the same; each sub-band differs solely in the frequency of its local oscillator (51, 52, . . . , 55).

After frequency demultiplexing in the five BIFFACs, and after the switching as performed under instructions from external control means (not shown), the four IF signals present at the outputs from the switching matrices (2) are conveyed via respective sets of four mixers (7) whose second inputs are fed by the same local oscillator (51, 52, . . . , 54) as is used for conversion to BIFFAC IF, thereby performing the reverse frequency conversion to that applied at the input to the BIFFACs. The frequency sub-bands are then restored in their mutual relationships, i.e. each sub-band has a center frequency that differs from the center frequency of its immediate neighbor by a difference which is equal to the bandwidth of a pair of BIFFACs (1, 2).

In the example of this figure, there are four down link spots, thereby enabling four output signals $So_1$, $So_4$ to be conveyed. The four output mixers of each BIFFAC correspond to these four spots respectively. The output spot is then determined by the switching and combination matrix (2) in each BIFFAC. The signals at BIFFAC IF are recombined in the 5 to 1 couplers (14) after mixing and frequency translation in the mixers (7), thereby reconstituting the output signals for the spots. There only remains to perform frequency translation to the HF frequency of the down link as performed by a final bank of mixers (7) immediately before power amplification (not shown).

Because the number of BIFFACs is limited and connectivity can be great: 3×3 or 4×4; it is advantageous for flexibility purposes to operate with frequency overlaps between BIFFACs, which means that there will be some unused channels if the frequencies concerned are not reused. This architecture makes it possible to obtain a solution and flexibility in allocating spectrum to the various links. The penalty of this architecture lies in the high number of frequency transpositions. The number of local oscillator frequencies is limited to the number of pairs of BIFFACs. The architecture shown in FIG. 5 includes frequency transposition in two steps: HF→ IF$_1$→ IF$_2$.

By converting to IF$_1$ (at about 650 MHz, for example), it is possible to perform better filtering prior to mixing (for eliminating image band noise), or after mixing (to eliminate unwanted mixing products). In particular, on each output corresponding to a down link, a bandpass filter of width equal to the input band may be added in order to eliminate undesirable mixing products.

Figure 6:
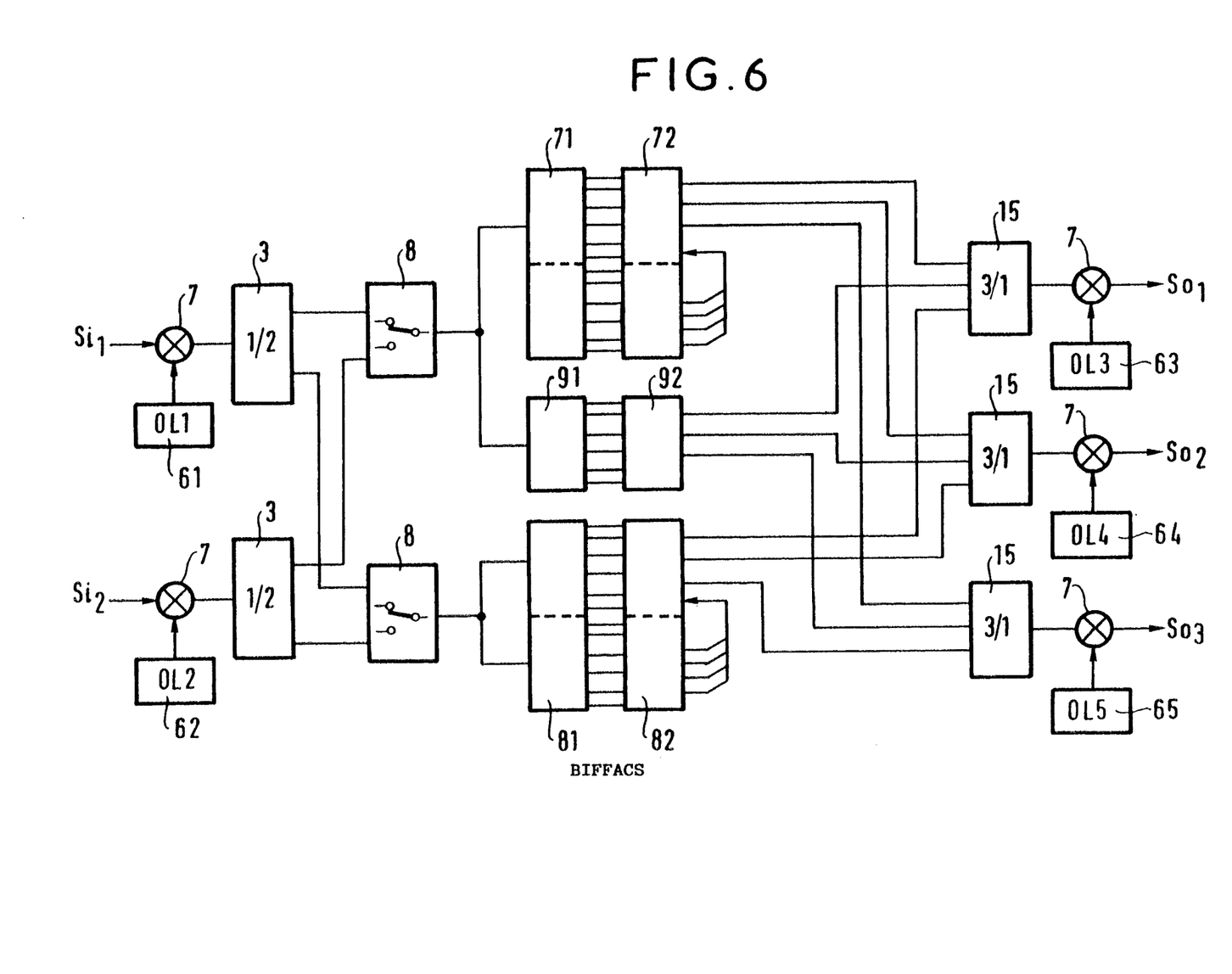
FIG. 6 is a block diagram of an example of payload architecture using a plurality of BIFFAC apparatuses of the invention suitable for performing intermediate band switching.

FIG. 6 is a diagram of another example of payload architecture using a plurality of BIFFAC apparatuses of the invention, suitable for performing switching in "intermediate" band. This configuration represents a compromise between the two solutions of FIGS. 4 and 5, where the number of BIFFACs is greater than in FIG. 4 and optionally smaller than in FIG. 5. The number of filter banks and the number of input spots are selected: in the example of FIG. 6, there are two input spots. The main difference between FIG. 6 and FIG. 5 lies in the absence of intermediate frequency changes.

As in the two preceding examples, there are two input signals Si$_1$ and Si$_2$ coming from different up links, and applied to the first inputs of respective mixers (7). The second inputs of these mixers are connected respectively to a local oscillator (61) that provides a first frequency for shifting the signal Si$_1$ to a first intermediate frequency IF$_1$ and to a second local oscillator (62) providing a second frequency for shifting the signal Si$_2$ to a second intermediate frequency IF$_2$.

The number of BIFFAC assemblies at different frequencies is determined by the maximum capacity allocated to each spot, i.e. the maximum bandwidth allocated to each input signal Si$_1$, Si$_2$. By means of couplers (3) and DPST switches (8) the input signals Si$_1$ and Si$_2$ are conveyed either to a first set of BIFFACs (71, 72) or else to a second set of BIFFACs (81, 82). In the present example, the first set (71, 72) is selected to have a greater bandwidth so as to show how this is possible. The mode of operation which can be generalized to a larger number of input spots is as follows: the traffic on each spot is subjected to the same frequency shift plus the sum of the bandwidth allocated to the preceding spots. This assumes that the frequencies of the local oscillators (61, 62, . . . ) differ by 18 MHz or by 36 MHz (nominal and not counting guardbands), so as to be compatible with the conventional channels of present-day transponders.

After switching and summing in the BIFFAC assemblies (71, 72, 81, 82, . . . ), the signals are grouped together again by the output couplers (15) prior to being transposed in frequency to the frequencies of the output spots. The frequency transposition of each output spot is equal to a constant frequency plus a frequency that represents the sum of the bandwidths of the previously allocated spots, by symmetry with the frequency transpositions performed on input.

In the present example of three output spots, this requires three local oscillators (63, 64, 65) at different frequencies. The result is that the output signals So$_1$, So$_2$, and So$_3$ are at frequencies that are different but in bands that are contiguous, i.e. the output is in channels.

Frequency band allocation must take account of the fact that it is not possible to allocate a given output with frequency bands having the same center frequency. Algorithms exist for avoiding this kind of phenomenon, and they are identical to the algorithms used for controlling frames in TDMA. The ground stations are assumed to co-operate.

The various architectures described with reference to the last three figures give an idea of the examples that can be developed on the basis of BIFFAC apparatuses of the invention. Other, more complex architectures will easily be devised by the person skilled in the art on the basis of the principles explained above and without going beyond the ambit of the present invention. The invention makes it possible to achieve greater flexibility in managing on-board resources, with minimal penalties in weight and bulk, and with a smaller requirement for redundant equipment compared with the prior art.

We claim:

1. An apparatus comprising an integrated bank of filters, having outputs that are combinable by switching, for switching input signals Si on n input ports to output signals So on m output ports, each of said input and output signals having a center frequency and occupying a bandwidth about said center frequency, the apparatus comprising at least p bandpass filters of bandwidth $\Delta\Phi$, with center frequencies $f_j$ where j is an integer in the range p inclusive, the frequency difference between the center frequencies of two filters that are adjacent in frequency being substantially equal to the bandwidth $\Delta\Phi$ of the passband of the bandpass filter, the number p being selected as a function of the bandwidth of the widest signal to be switched, $\Delta F_{max} = p\Delta\Phi$, each of said input signals Si being applied to the inputs of p filters, the apparatus further comprising a switching and combining matrix, said matrix having not less than p inputs and not less than m outputs, said inputs to said matrix being connected to said bandpass filters so as to pick up signals passing through said filters, and wherein said filters and paths through said switching matrix are matched in phase and in amplitude.

2. Apparatus according to claim 1, wherein said bandpass filters are implemented in surface acoustic wave component technology.

3. Apparatus according to claim 2, wherein a plurality q of said SAW bandpass filters are integrated on a single substrate, and wherein said bank of filters is made up of r=p/q substrates each including q bandpass filters.

4. Apparatus according to claim 1, wherein said bandpass filters are implemented in digital technology.

5. Apparatus according to claim 1, wherein said switching and combining matrix is integrated with at least one of said p bandpass filters in a common housing thus forming a single switching module.

6. Apparatus according to claim 5, wherein said matrix and said bandpass filters are integrated on a common substrate.

7. Apparatus according to claim 2, wherein said substrate is lithium niobate.

8. Apparatus according to claim 2, wherein said substrate is lithium tantalate.

9. Apparatus according to claim 2, wherein said substrate is quartz.

10. A payload architecture for use in space to enable transparent switching of input signals Si on n input ports to output signals So on m output ports, each of said input and output signals having a center frequency and occupying a bandwidth about said center frequency, said input and output signals being capable of having different center frequencies and being capable of occupying different bandwidths, the architecture further including one or more banks of filters and one or more switching and in-phase summing matrices, wherein each of said banks of filters comprises at least p bandpass filters of bandwidth $\Delta\Phi$, with center frequencies $f_j$ where j is an integer in the range 1 to p inclusive, the frequency difference between the center frequencies of two filters that are adjacent in frequency being substantially equal to the bandwidth $\Delta\Phi$, of the passband of the bandpass filter, the number p being selected as a function of the bandwidth of the widest signal to be switched, $\Delta F_{max} = p\Delta\Phi$, each of said input signals Si being applied to the inputs of p filters, and each of said switching and in-phase summing matrices has not less than p inputs and not less than m outputs, the p inputs being connected to said bandpass filters so as to pick up signals passing through said filters, and wherein said filters and paths through each of said switching matrices are matched in phase and in amplitude.

11. A payload architecture according to claim 10, further including at least one frequency-changing assembly.

12. A payload architecture according to claim 11, said frequency-changing assembly comprising two frequency-changing subassemblies: a first subassembly that performs a first change from the frequencies of the input signals Si to an intermediate frequency IF, using a first local oscillator which is at the same frequency for all of the input signals and all of the banks of filters and, alter filtering in said filters and after switching and in-phase combining in said matrices, a second subassembly performs a second frequency change, using a second local oscillator, from IF to a final frequency of the output signals So, such that the bandwidth at intermediate frequency is the same as the bandwidth of the input signals Si and of the output signals So.

13. A payload architecture according to claim 11, said frequency-changing assembly comprising three frequency-changing subassemblies which perform four successive frequency changes: a first change from the frequencies of the input signals Si to a first intermediate frequency $IF_1$ is performed using a single local oscillator frequency for all of the input signals Si; a second frequency change to a second intermediate frequency $IF_2$ prior to application is performed on the input signals of the input signals to the inputs of said banks of filters, where all of the banks of filters have the same center frequency, said second intermediate frequency $IF_2$ being the same for all of the banks of filters, thereby requiring a plurality of local oscillators of different frequencies, each of said local oscillators corresponding, respectively, to each of said banks of filters after filtering in said filters and after switching and in-phase combining in said matrices, a third frequency change is performed to the first intermediate frequency $IF_1$, using the same local oscillators as in the preceding change; and finally a fourth frequency change is performed by the third subassembly to a final frequency for the output signals So.

14. A payload architecture according to claim 11, said frequency-changing assembly comprising a frequency changing subassembly for each of said input signals Si and for each of said output signals So, and wherein utilization frequencies are distributed in such a manner that the bandwidths of the input and output signals Si and So are integer multiples of the unit bandwidths of a filter of one of said banks of filters.

15. A method of switching on-board a satellite, the method performing switching between input signals Si on n input ports to output signals So on m output ports, each of said input and output signals having a center frequency and occupying a bandwidth about said center frequency, each of said input and output signals being capable of having different center frequencies and being capable of occupying different bandwidths, the method including the following steps for each of said input signals to be switched:

applying an input signal to be switched coming from one of the n input ports and having a bandwidth $\Delta F = p\Delta\Phi$, via a first switching matrix, to a bank of bandpass filters having a passband $\Delta\Phi$ for all of the filters, thereby splitting the input signal into a plurality, p, of narrow bands of constant width $\Delta\Phi$ regardless of the bandwidth of said input signal $\Delta F = p\Delta\Phi$, thereby demultiplexing the input signal; and reassembling the input signal in phase from the p bands of width $\Delta\Phi$ by means of a second switching and summing matrix which sends the p bands of width $\Delta\Phi$ to one of the m output ports, said reassembling step performing a multiplexing operation, and wherein a configuration of the switching matrix is controlled as a function of the duration of the input signals, of the input ports of the input signals and of the output ports of the output signals, and of the bandwidth $\Delta F$, i.e. the number p of bandpass filters of bandwidth $\Delta\Phi$ required for transmitting the output signals without degradation.

16. A method according to claim 15, further including the following steps:

prior to the input signal being demultiplexed, and with said input signal being characterized by a first center frequency $Fc_i$ in the microwave range, performing a frequency conversion to a lower intermediate frequency IF; and after the input signal has been multiplexed at intermediate frequency IF, performing a frequency conversion to a higher second center frequency $Fc_o$, e.g. in the microwave range, said frequency $Fc_o$ being characteristic of the output signal So.

17. A method according to claim 16, wherein said first center frequency $Fc_i$ is different from said second center frequency $Fc_o$.

18. A method according to claim 16, wherein said first center frequency $Fc_i$ is similar to said second center frequency $Fc_o$.

19. A method according to claim 15, wherein each filter of passband $\Delta\Phi$ corresponds to a center frequency $f_j$ where j is an integer in the range 1 to p inclusive, and wherein the frequency difference between adjacent center frequencies $f_j$ and $f_{j+1}$ is equal to the filter pass-bandwidth $\Delta\Phi$.

20. A method according to claim 15, wherein a bandwidth $\Delta Fi$ of the input signals Si is substantially less than 36 MHz, for at least a major portion of the input signals to be conveyed.

21. A method according to claim 15, wherein the bandwidth $\Delta\Phi$ of the bandpass filters is substantially less than 36 MHz.

22. A method according to claim 15, wherein the bandwidth $\Delta\Phi$ of the bandpass filters is not greater than 6 MHz.

* * * * *